Oct. 16, 1956  A. H. SIEVERS  2,766,725
AUTOMATIC FEED MOISTENING HOPPER AND TROUGH
Filed April 6, 1955  2 Sheets-Sheet 1
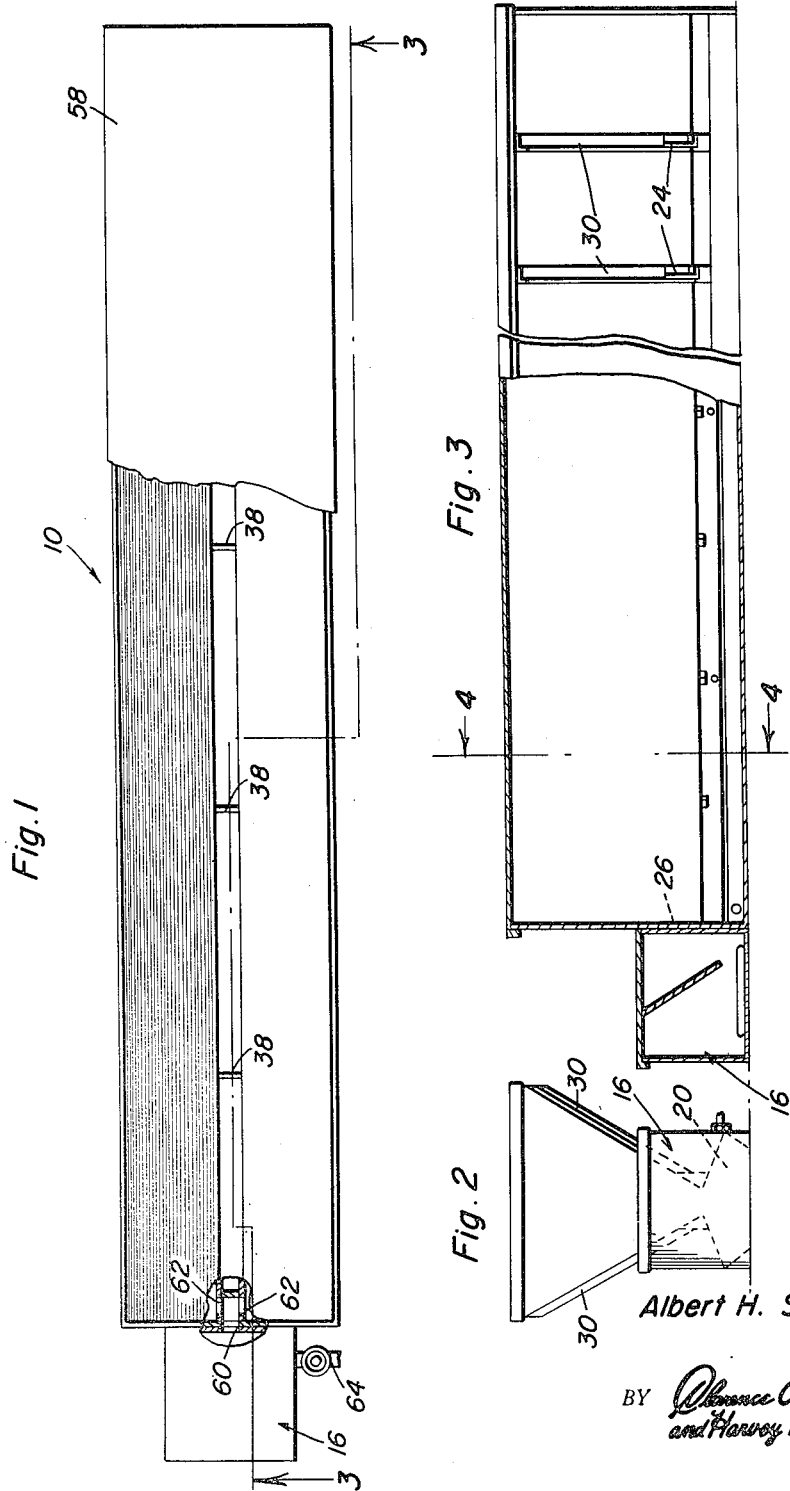
Albert H. Sievers
INVENTOR.

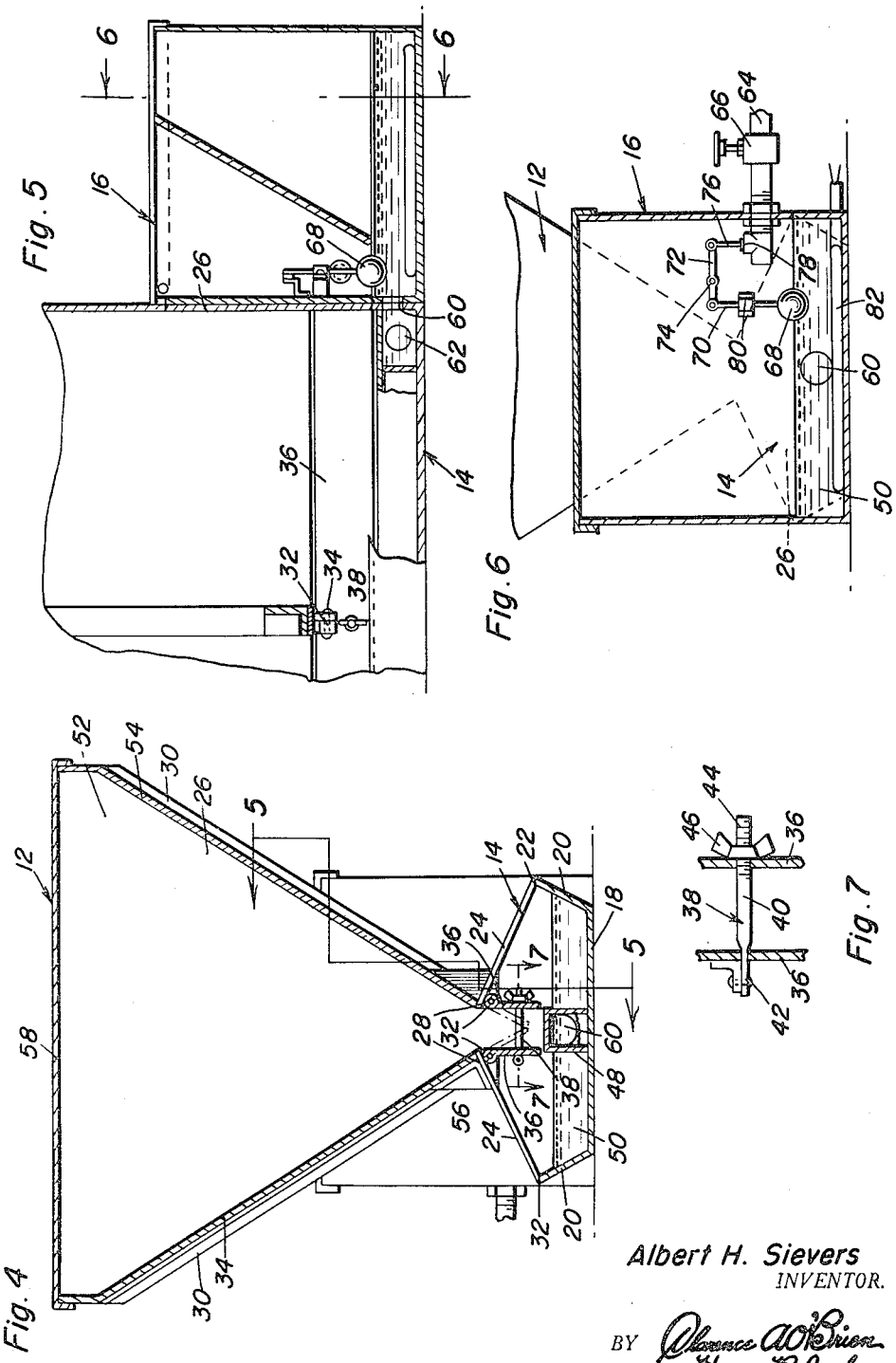

United States Patent Office 2,766,725
Patented Oct. 16, 1956

2,766,725

AUTOMATIC FEED MOISTENING HOPPER AND TROUGH

Albert H. Sievers, Fieldon, Ill.

Application April 6, 1955, Serial No. 499,664

1 Claim. (Cl. 119—51.5)

This invention relates generally to stock feeders, and is more particularly directed to the hog feeder which includes means providing a feeder soaker and watering trough, as well as including means for adjusting the amount of feed to be permitted to enter into said feeder.

A further object of invention in conformance with that set forth above is to provide in a hog feeder, a watering trough and hopper arrangement including means for automatically soaking the feed, means for adjustably permitting the feed to enter into the watering trough, as well as means for heating and maintaining a given supply of water therein.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view, with parts broken away for clarity, of the novel feeder;

Figure 2 is an end elevational view of the novel feeder looking from left to right in Figure 1;

Figure 3 is a vertical sectional view taken substantially on line 3—3 of Figure 1;

Figure 4 is an enlarged transverse sectional view taken substantially on line 4—4 of Figure 3;

Figure 5 is a fragmentary sectional view taken substantially on line 5—5 of Figure 4;

Figure 6 is a sectional view taken substantially on line 6—6 of Figure 5; and

Figure 7 is an enlarged sectional view taken substantially on line 7—7 of Figure 4.

The self-feeder is indicated generally at 10 and includes a hopper assembly 12, a watering trough assembly 14 and a water box 16.

The water trough, hopper and water box may all be made of a suitable sheet metal such as 8-gauge steel, or any other suitable metal, however, of course the watering trough and water box being fabricated to prevent leakage therefrom.

The watering trough 14 includes a base portion 18 having upwardly diverging sides 20 connected at their upper edges 22 to a plurality of uniformly spaced converging spacing members 24, the side members 26. Extending upwardly in diverging relationship from the upper edges 28 of the spacing elements 24 are hopper retaining channel members 30. Extending from the edges 28 in longitudinal spaced relationship therefrom are a plurality of hinge elements 32 which have pivotally secured thereto by means of pivot pins 34 adjustable feed control aprons 36 which extend the entire length of the watering trough 14. Extending through aligned apertures in the aprons 36 and across the open slot defined by edges 28 of the watering trough, are a plurality of adjusting elements 38, as best seen in Figure 7, which include a bolt element 40 extending between the adjustable aprons 36, having one end pivotally connected as at 42 to accommodate for relative movement between the aprons 36, the other end of the bolt element 40 being threaded as shown at 44 and having an adjustable wing nut element 46 secured thereon. Extending longitudinally of the watering trough 14 is an inverted U-shaped element 48 which aids in separating the feed, i. e., insuring that it falls on either side of the watering trough into the water, indicated at 50, see Figure 4, the adjusted position of the aprons 36 being shown in dotted lines.

The hopper element 12 includes a pair of end members 52 including converging edges which are secured to longitudinally extending converging sides 54 defining an open slotted lower portion cooperating with the adjustable aprons 36. The feed hopper 12 is supported within the diverging channels 30, as also seen in Figure 4. The channels 30 may be reinforced by means of suitable gusset elements 56. A suitable cover 58 may be provided on the top of the hopper 12 for the protection of the feed therein. Thus it is believed readily apparent that by adjusting the wing nuts 46 and the relative distance between the aprons 36, the amount of feed passing from the feed hopper 12 into the watering trough 14 may be controlled, and also the hopper may be removed from the watering trough 14 and the watering trough 14 may be utilized without the hopper. The spacing elements 24 aid to keep the hogs from getting into the watering trough, and the inverted U-shaped element 48 aids in distributing the feed within the watering trough.

Connected on one of the ends of the watering trough, is a watering box 16, which is in communication therewith by means of the cooperating apertures 60 therebetween, the inverted U-shaped channel 48 including apertures 62 for permitting the water to pass into the water trough 14. The watering box 16 is supplied by means of a suitable water line 64, the flow through which is controlled by a conventional valve 66, the level in the watering box being maintained by means of a float 68 pivotally connected to a link 70 which is pivotally connected to a link 72 intermediately pivoted at 74 on one of the walls of the water box. The link 72 having its other end pivoted to a link 76 which controls the amount of water permitted to enter the water box, i. e., when the level of the water 50 goes below a predetermined level, the float 68 being lowered permits the valve element 78 to move upwardly from a suitable valve seat in the water line 64 permitting the entry of water into the water box. Indicated at 80 is an adjustable nut for the purpose of adjusting the relative length of link 70. Secured on the lower portion of the water box is a temperature control element 82, of any conventional nature, which may be adjusted for retaining the heat of the water at a given temperature.

Thus it is believed readily apparent that there has been disclosed a novel animal feeding and watering trough fully conforming with the objects of invention heretofore set forth.

Various positional directional terms such as "front," "rear," "top," etc., or any other such terms are intended to have only a relative connotation to aid in describing the device and are not intended to be interpreted as requiring any particular orientation with respect to any external elements.

The foregoing is considered as illustrative only of the principles of the invention. Further, since numerous moifications and changes will readily occur to those skilled in the art, it is not desired to limit the invention to the exact construction and operation shown and described, and accordingly all suitable modifications and equivalents may be resorted to, falling within the scope of the appended claim.

What is claimed as new is as follows:

A stock feeder of the character described comprising: a trough, a substantially V-shaped feed hopper mounted longitudinally on said trough and having a longitudinally elongated discharge opening in its lower portion communicating with said trough, an inverted substantially U-shaped hollow feed spreader mounted longitudinally in the trough beneath the opening, a pair of opposed aprons pivotally suspended in the trough for the passage of the feed therebetween from the hopper and cooperable with the spreader for regulating the flow of the feed, means for adjusting said spreaders, and means at one end of the trough for supplying water to the spreader, said spreader having water outlet openings therein for soaking the feed in the trough.

References Cited in the file of this patent

UNITED STATES PATENTS

| | | |
|---|---|---|
| 1,491,630 | Reid | Apr. 22, 1924 |
| 1,982,237 | Tomkins | Nov. 27, 1934 |
| 2,111,190 | McGuire | Mar. 15, 1938 |
| 2,171,998 | Trapani | Sept. 5, 1939 |
| 2,363,212 | Wagner | Nov. 21, 1944 |
| 2,530,597 | Chandler | Nov. 21, 1950 |
| 2,640,464 | Jindrich | June 2, 1953 |
| 2,659,346 | Paparazzo et al. | Nov. 17, 1953 |